United States Patent [19]

Alas et al.

[11] Patent Number: 4,669,592

[45] Date of Patent: Jun. 2, 1987

[54] TORSIONAL DAMPER DEVICE

[75] Inventors: Jacques Alas, Eaubonne; Michel Graton, Paris, both of France

[73] Assignee: Valeo, Paris, France

[21] Appl. No.: 702,581

[22] Filed: Feb. 19, 1985

[30] Foreign Application Priority Data

Feb. 23, 1984 [FR] France ............ 84 02761

[51] Int. Cl.$^4$ ............... F16D 3/66
[52] U.S. Cl. ............... 192/106.2; 464/68
[58] Field of Search ........... 192/106.2, 106.1, 70.17; 464/68

[56] References Cited

U.S. PATENT DOCUMENTS

| | | | |
|---|---|---|---|
| 2,104,106 | 1/1938 | Swennes | 192/106.1 |
| 2,105,188 | 1/1938 | Guy | 192/70.17 |
| 2,210,074 | 8/1940 | Friedman | 192/106.2 |
| 3,101,600 | 8/1963 | Stromberg | 192/106.2 X |
| 3,762,521 | 10/1973 | Dotter | 192/106.2 |
| 4,222,476 | 9/1980 | Le Brise | 192/106.2 |
| 4,270,644 | 6/1981 | Billet | 192/106.2 |
| 4,398,625 | 8/1983 | Beccaris | 464/68 X |
| 4,399,895 | 8/1983 | Kubo et al. | 192/106.2 X |
| 4,410,075 | 10/1983 | Caray et al. | 192/106.2 |
| 4,493,408 | 11/1985 | Nagano | 192/106.2 |
| 4,518,071 | 5/1985 | Nozawa | 192/106.2 |

FOREIGN PATENT DOCUMENTS

| | | |
|---|---|---|
| 1265509 | 4/1968 | Fed. Rep. of Germany ... 192/106.1 |
| 2064377 | 5/1979 | Fed. Rep. of Germany . |
| 2099137 | 3/1972 | France . |
| 2097289 | 3/1972 | France . |
| 2119133 | 8/1972 | France . |
| 2195298 | 3/1974 | France . |
| 2267482 | 11/1975 | France . |
| 1354034 | 5/1974 | United Kingdom . |
| 1493002 | 11/1977 | United Kingdom . |

*Primary Examiner*—Rodney H. Bonck
*Attorney, Agent, or Firm*—Charles E. Brown; Charles A. Brown

[57] ABSTRACT

A torsional damper device comprises two coaxial parts disposed to rotate relative to one another within defined limits of relative angular movement. One comprises a hub flange and the other two guide rings disposed one on each side of the hub flange. Spacers fasten together the guide rings and elastic means are disposed circumferentially between the coaxial parts, housed in openings in circumferential series in the hub flange and in each guide ring. At least one of the guide rings features U-shaped peripheral stamped portions each associated with one opening, being radially aligned with the respective opening outwardly thereof. A circumferential strip separates each stamped portion and the corresponding opening.

10 Claims, 4 Drawing Figures

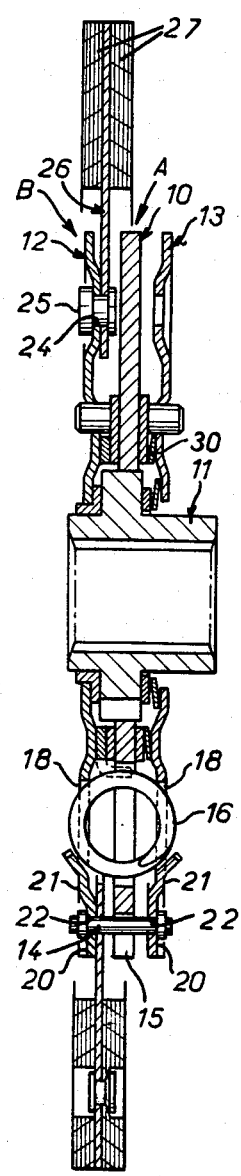
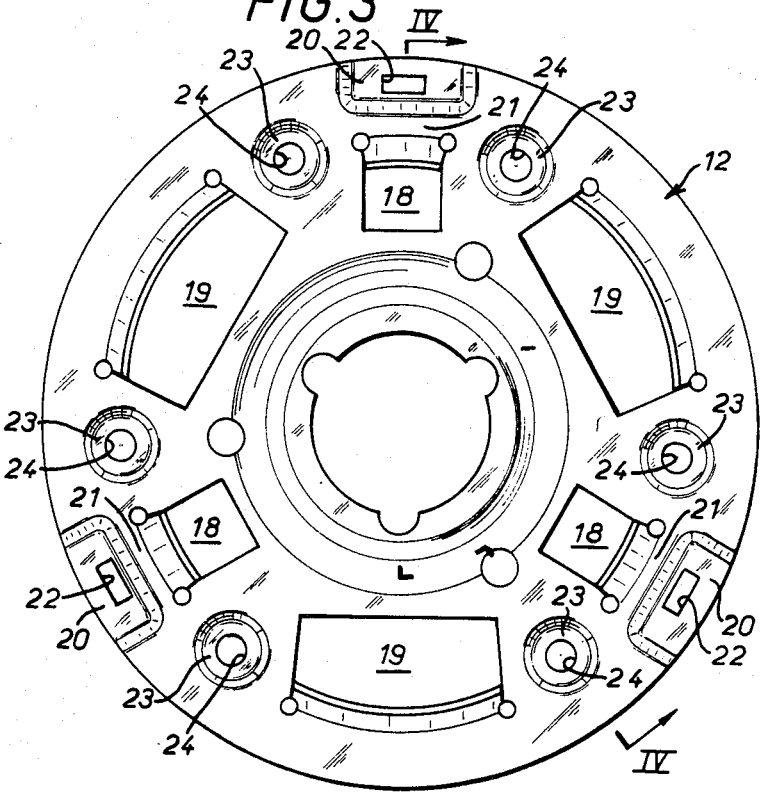
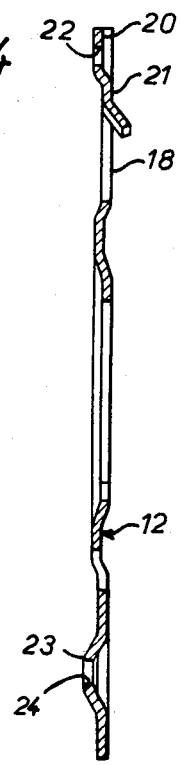

TORSIONAL DAMPER DEVICE

BACKGROUND OF THE INVENTION

1. Field of the Invention

The present invention relates to a torsional damper device, inter alia for automobile vehicle clutch disks, comprising at least two coaxial parts disposed to rotate relative to one another within defined limits of relative angular movement and of which one comprises a hub flange and another two guide rings disposed one on each side of the hub flange and fastened to one another by spacers, and elastic means disposed circumferentially between the coaxial parts and accomodated in openings in circumferential series in the hub flange and in each of the guide rings.

2. Description of the Prior Art

This type of torsional damper device is normally incorporated in the design of a clutch disk, particularly for automobile vehicles, the hub flange being associated with a hub which is designed to be constrained to rotate with a driven shaft, the primary shaft of the automobile vehicle gearbox for example, whereas one of the guide rings receives a fixed facing holder which is designed to be coupled to the driving shaft of the automobile vehicle when the clutch is engaged.

For construction and assembly reasons the guide rings comprise numerous openings, in particular openings to accommodate the elastic means and various holes, in particular for mounting the spacers which fasten the two guide rings to one another and also for fastening the facing holder to one of the guide rings. All these openings reduce the mechanical strength of the guide ring.

An object of the present invention is a torsional damper device, inter alia for automobile vehicle clutch disks, the construction of which is particularly strong, notwithstanding the existence of the various aforementioned openings.

SUMMARY OF THE INVENTION

The invention consists in a torsional damper device comprising at least two coaxial parts disposed to rotate relative to one another within defined limits of relative angular movement, wherein one of said coaxial parts comprises a hub flange and another of said coaxial parts comprises two guide rings disposed one on each side of said hub flange, spacers adapted to fasten together said guide rings, elastic means disposed circumferentially between said coaxial parts, openings adapted to accomodate said elastic means in circumferential series in said hub flange and in each of said guide rings, wherein at least one of said guide rings features U-shaped peripheral stamped portions each associated with a respective one of said openings, said stamped portion being radially aligned with said opening outwardly thereof, and a circumferential strip separating said stamped portion and said opening.

Both guide rings are preferably provided with stamped portions.

By virtue of this arrangement the U-shaped peripheral stamped portions stiffen and strengthen the guide ring, the circumferential strip between each peripheral stamped portion and the corresponding opening avoiding any weakening of the structure.

In accordance with another characteristic of the invention, the U-shaped stamped portions in one guide ring project in the direction towards the other guide ring and each U-shaped stamped portion features a hole for mounting a spacer linking the two guide rings.

This arrangement permits the use of linking spacers which are short since the stamped portions in the guide rings used to mount them extend towards one another. Because of this, the structure is both strong and compact.

The hole in each U-shaped stamped portion is preferably rectangular and the spacer flat and the various spacers pass through peripheral notches in the hub flange.

According to another characteristic of the invention, the circumferential series of openings in each guide ring comprises openings of relatively greater circumferential extent alternating with openings of relative smaller circumferential extent and each U-shaped stamped portion is associated with one of said openings of relatively smaller circumferential extent.

By virtue of this arrangement the structure of the guide ring is particularly strong, with good distribution of the material of the guide ring.

According to another characteristic of the invention, each guide ring comprises round stamped portions each of which is disposed circumferentially between two adjacent openings. Each round stamped portion of a guide ring preferably features a hole for fastening a facing holder to said guide ring.

In this way the benefits of excellent distribution of the various openings and stamped portions in a restricted space are obtained. It will be noted that the length of the opening is that which would exist in the absence of the U-shaped stamped portions and the round stamped portions.

The round stamped portions in each guide ring preferably extend in the direction towards the other guide ring and project further than the U-shaped stamped portions.

Other objects and advantages will appear from the following descripion of an example of the invention when considered in connection with the accompanying drawings and the novel features will be particularly pointed out in the appended claims.

BRIEF DESCRIPTION OF THE DRAWINGS

FIG. 2 is a view of this clutch disk in cross-section on the broken line II—II in FIG. 1.

FIG. 3 is a view in elevation of one of the guide rings.

FIG. 4 is a view of this guide ring in cross-section on the broken line IV—IV in FIG. 3.

DESCRIPTION OF THE PREFERRED EMBODIMENT

Figure 1:
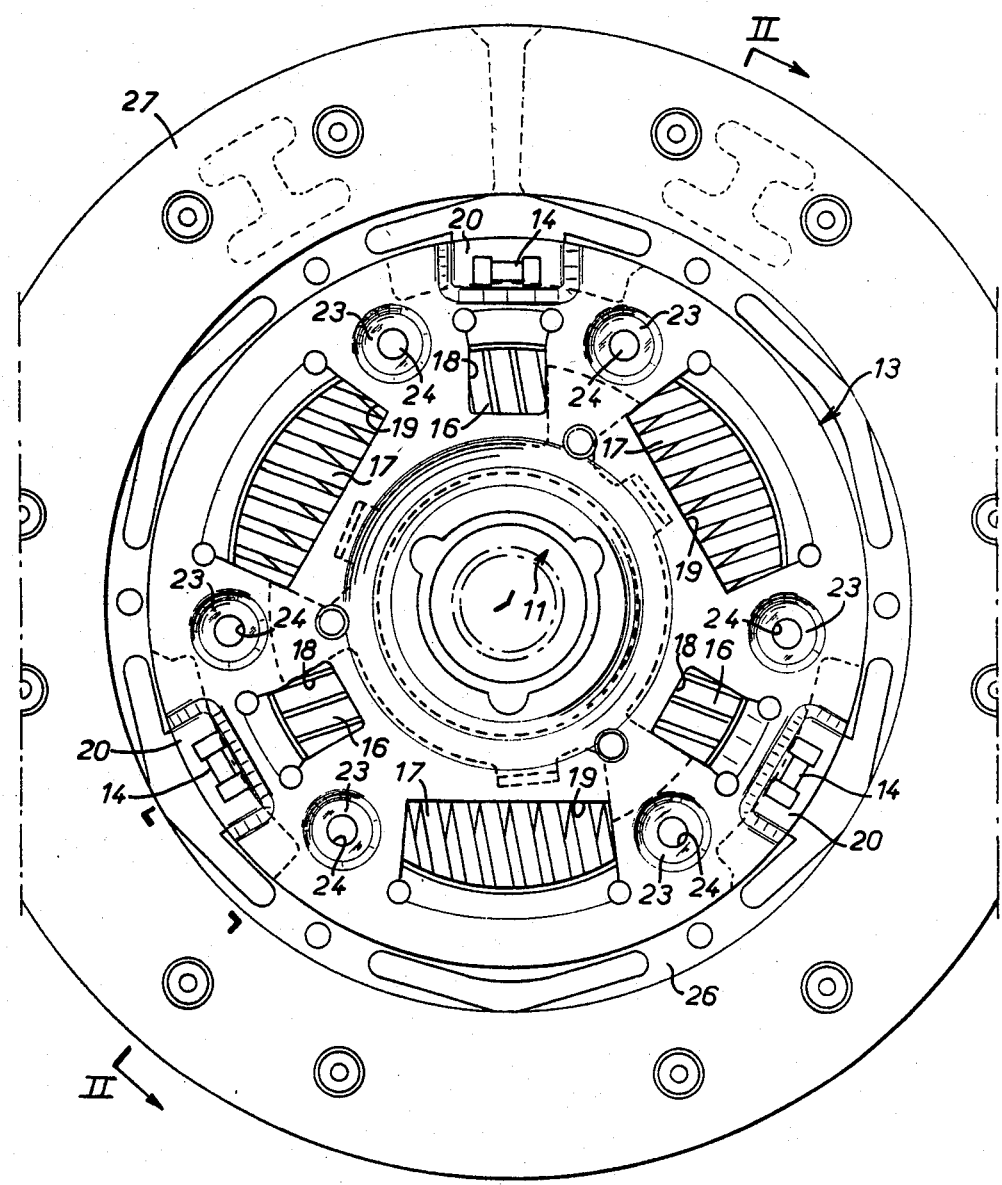
FIG. 1 is a partially cutaway view in elevation of an automobile vehicle clutch disk incorporating a torsional damper device in accordance with the invention.

In the embodiment shown by way of example in FIGS. 1 through 4, a torsional damper device inter alia for automobile vehicle clutch disks comprises two coaxial parts A and B. The parts A and B are disposed to rotate relative to one another within defined limits of relative angular movement.

The part A comprises a hub flange 10 which is associated with a hub 11 designed to be mounted on and constrained to rotate with the primary shaft of the automobile vehicle gearbox.

The part B comprises two identical guide rings 12 and 13 respectively disposed one on each side of the hub flange 10. The guide rings 12 and 13 are fastened to one another by spacers 14 which pass through peripheral notches 15 in the hub flange 10.

Elastic means 16, 17 are disposed circumferentially between the coaxial parts A and B. These elastic means comprise high-stiffness springs 16 accommodated in openings 18 of relatively smaller circumferential extent formed in the guide rings 12 and 13 and in the hub flange 10 and also springs 17 of lower stiffness accommodated in openings 19 of relatively greater circumferential extent formed in the guide rings 12 and 13 and in the hub flange 10. In practice, the openings 18 in the hub flange are larger than the openings 18 in the rings 12 and 13, whereas all of the openings 19 are the same size.

The various openings 18 and 19 are disposed in circumferential series at substantially the same average radius. The openings 18 of relatively smaller circumferential extent alternate with the openings 19 of relatively greater circumferential extent.

Each guide ring 12, 13 has U-shaped peripheral stamped portions 20. Each peripheral stamped portion 20 is associated with one of alternate openings 18, 19, more specifically an opening 18 of relatively smaller circumferential extent. Each U-shaped stamped portion stiffens the ring 12, 13, both axially by virtue of its branches and circumferentially by virtue of its base.

Each U-shaped peripheral stamped portion 20 is radially aligned with an opening 18, outwardly of the latter and separated from it by a circumferential strip 21.

The U-shaped stamped portions 20 in the guide ring 12 project in the direction towards the other guide ring 13.

Each U-shaped stamped portion 20 features a hole 22 for mounting a spacer 14 linking the two guide rings 12 and 13. The hole 22 is rectangular and the spacer 14 is flat.

Each guide ring 12, 13 further comprises round stamped portions 23. Each round stamped portion 23 is disposed circumferentially between two adjacent openings 18 and 19, that is to say in practice between and opening 18 of relatively smaller circumferential extent and an opening 19 of relatively greater circumferential extent.

Each round stamped portion 23 features a hole 24 for attaching, as by a rivet 25, for example, a holder 26 carrying friction facings 27.

It will be seen in FIG. 3 that the holes 22 and 23 are disposed at the corners of a triangle, which is favorable to the strength of the guide rings 12, 13.

The facing holder is designed to be coupled to the automobile vehicle driving shaft when the clutch is engaged, for example by being clamped between two plates of the clutch.

It will be seen in FIG. 2 that the support 26 carrying the facings 27 is fixed to one only of the two guide rings, the ring 12 for example, whereas the ring 13 does not receive any facing holder. The ring 13 nevertheless comprises the round stamped portions 23 with the holes 24 with a view to standardization and to obtaining a structure which is both light and rugged.

As seen in FIG. 2, the round stamped portions 23 of the guide ring 12 project in the direction towards the other guide ring 13. Also, the round stamped portions 23 project more than the U-shaped stamped portions 20 as shown in FIG. 4.

The particularly simple and rugged structure of the torsional damper device for clutch disks will be appreciated.

Note that by virtue of the U-shaped stamped portions 20, each guide ring 12, 13 is stiffened and can accommodate all sorts of forces without risk of deformation, in particular forces exerted by springs serving to regulate friction forces, such as the spring 30 shown in FIG. 2.

It will be understood that various changes in the details, materials and arrangements of parts which have been herein described and illustrated in order to explain the nature of the invention may be made by those skilled in the art within the principle and scope of the invention as expressed in the appended claims.

There is claimed:

1. Torsional damper device comprisng at least two coaxial parts disposed to rotate relative to one another within defined limits of relative angular movement, wherein one of said coaxial parts comprises a hub flange and another of said coaxial parts comprises two guide rings disposed one on each side of said hub flange, spacers fastening together said guide rings, elastic means disposed circumferentially between said coaxial parts, a circumferential series of openings in said guide rings and said hub flange accommodating said elastic means, at least one of said guide rings having a radially outwardly opening U-shaped stamped portion radially aligned with and outwardly of at least one of said openings, a circumferential strip separating said stamped portion from said one opening, one of said spacers extending through a hole in said U-shaped stamped portion, other stamped portions being disposed circumferentially between said one opening in said at least one guide ring and adjacent said openings in said at least one guide ring so as to define a triangular array of stamped portions in said at least one guide ring.

2. A device according to claim 1, wherein both of said guide rings have said stamped portions.

3. A device according to claim 2, wherein said holes in said U-shaped portions are rectangular and said one spacer extending through said hole is of flat rectangular cross section.

4. Device according to claim 2, wherein said circumferential series of openings in each of said guide rings comprises openings of relatively greater circumferential extent alternating with openings of relatively smaller circumferential extent and said at least one U-shaped stamped portion is associated with a respective one of said openings of relatively smaller circumferential extent.

5. A device according to claim 1, wherein said hole in said U-shaped stamped portion is rectangular and said one spacer extending therethrough is of flat rectangular cross section.

6. A device according to claim 5, wherein said spacers extend through peripheral notches in said hub flange.

7. A device according to claim 1, wherein said other stamped portions are round, and a hole in each other stamped portion for fastening a friction fastening support to said one guide ring.

8. A device according to claim 1, wherein other stamped portions in said one guide ring project axially toward said other guide ring.

9. A device according to claim 1, wherein both of said U-shaped portions and said other stamped portions in said one guide ring protrude axially toward the other of said guide rings.

10. A device according to claim 9, wherein said other stamped portions project axially further than said U-shaped stamped portions.

* * * * *